(12) United States Patent
Ramsdell et al.

(10) Patent No.: US 10,752,179 B2
(45) Date of Patent: Aug. 25, 2020

(54) VEHICLE HITCH MOUNTED BICYCLE RACK

(71) Applicant: Yakima Products, Inc., Lake Oswego, OR (US)

(72) Inventors: Lyle Andrew Ramsdell, Columbia City, OR (US); Jason Attfield Sagen, Portland, OR (US); Scott A. McFadden, Portland, OR (US); David Condon, Beaverton, OR (US)

(73) Assignee: Yakima Products, Inc., Lake Oswego, OR (US)

(*) Notice: Subject to any disclaimer, the term of this patent is extended or adjusted under 35 U.S.C. 154(b) by 80 days.

(21) Appl. No.: 15/613,590

(22) Filed: Jun. 5, 2017

(65) Prior Publication Data

US 2017/0349111 A1    Dec. 7, 2017

Related U.S. Application Data

(60) Provisional application No. 62/345,840, filed on Jun. 5, 2016.

(51) Int. Cl.
| | |
|---|---|
| *B60R 9/10* | (2006.01) |
| *B60R 9/06* | (2006.01) |
| *B60R 9/00* | (2006.01) |
| *B60R 11/00* | (2006.01) |

(52) U.S. Cl.
CPC .............. *B60R 9/10* (2013.01); *B60R 9/06* (2013.01); *B60R 9/00* (2013.01); *B60R 11/00* (2013.01)

(58) Field of Classification Search
CPC .............................. B60R 9/10; Y10S 224/924

USPC .......................................................... 224/924
See application file for complete search history.

(56) References Cited

U.S. PATENT DOCUMENTS

| 4,702,401 A | 10/1987 | Graber et al. | |
|---|---|---|---|
| 5,190,195 A | * 3/1993 | Fullhart | B60R 9/10 |
| | | | 224/497 |
| 5,330,084 A | * 7/1994 | Peters | B60R 9/06 |
| | | | 211/171 |

(Continued)

FOREIGN PATENT DOCUMENTS

| CA | 2531567 A1 | 6/2007 |
|---|---|---|
| EP | 0989029 A1 | 3/2000 |
| EP | 1568542 A1 | 8/2005 |

OTHER PUBLICATIONS

The U.S. Receiving Office of WIPO, International Search Report and Written Opinion of the International Searching Authority regarding PCT Patent Application No. PCT/US2017/035906, dated Aug. 14, 2017, 10 pages.

(Continued)

*Primary Examiner* — Scott T McNurlen
(74) *Attorney, Agent, or Firm* — Kolisch Hartwell, P.C.

(57) ABSTRACT

A hitch mounted rack for carrying a bicycle is disclosed. The rack includes a tongue portion configured for attachment to a hitch receiver behind a vehicle, and a beam structure connected to the tongue portion. A bike mount is secured to the first beam structure by a clamp assembly, the clamp assembly having an open and a closed position. In the closed position the clamp assembly fixes the bike mount to the beam structure. In the open position the clamp assembly permits movement of the bike mount in a first direction and a second orthogonal direction.

20 Claims, 15 Drawing Sheets

(56) References Cited

U.S. PATENT DOCUMENTS

| | | | |
|---|---|---|---|
| 5,377,886 A * | 1/1995 | Sickler | B60R 9/10 224/521 |
| 5,690,259 A * | 11/1997 | Montani | B60R 9/042 224/310 |
| 5,692,659 A | 12/1997 | Reeves | |
| 5,833,074 A | 11/1998 | Phillips | |
| 6,019,266 A | 2/2000 | Johnson | |
| 6,053,336 A | 4/2000 | Reeves | |
| 6,244,483 B1 * | 6/2001 | McLemore | B60R 9/06 224/521 |
| 6,439,397 B1 * | 8/2002 | Reeves | B60R 9/048 211/17 |
| 6,460,743 B2 | 10/2002 | Edgerly et al. | |
| 6,523,731 B1 | 2/2003 | Pedrini | |
| 6,640,979 B1 | 11/2003 | Mayfield | |
| 6,761,297 B1 | 7/2004 | Pedrini | |
| 6,857,545 B2 | 2/2005 | McLemore et al. | |
| 6,868,998 B2 | 3/2005 | Dean | |
| 6,976,615 B2 | 12/2005 | Dean | |
| 7,104,430 B2 | 9/2006 | Reeves | |
| 7,222,763 B2 | 5/2007 | Pedrini | |
| 7,240,816 B2 | 7/2007 | Tsai | |
| 7,648,151 B2 | 1/2010 | Pedrini | |
| 7,784,656 B2 | 8/2010 | Morrill et al. | |
| 8,113,398 B2 | 2/2012 | Sautter et al. | |
| 8,496,145 B2 * | 7/2013 | Sautter | B60R 9/045 224/315 |
| 2002/0005422 A1 | 1/2002 | Nusbaum | |
| 2004/0238582 A1 | 12/2004 | Pedrini | |
| 2006/0029483 A1 | 2/2006 | Allen et al. | |
| 2007/0164065 A1 | 7/2007 | Davis | |
| 2008/0099522 A1 | 5/2008 | Clausen et al. | |
| 2008/0164292 A1 | 7/2008 | Farney | |
| 2008/0303244 A1 * | 12/2008 | Wang | B60R 9/10 280/297 |
| 2009/0120984 A1 | 5/2009 | Sautter et al. | |
| 2009/0229093 A1 * | 9/2009 | Zwanenburg | B60R 9/06 24/499 |
| 2009/0236382 A1 | 9/2009 | Sautter et al. | |
| 2011/0132946 A1 * | 6/2011 | Sautter | B60R 9/045 224/324 |
| 2012/0125964 A1 * | 5/2012 | Sautter | B60R 9/06 224/497 |
| 2016/0068110 A1 * | 3/2016 | Prescott | B60R 9/10 224/521 |
| 2017/0050577 A1 * | 2/2017 | Lindholm | B60R 9/048 |

OTHER PUBLICATIONS

The International Bureau of WIPO, International Preliminary Report on Patentability regarding PCT Patent Application PCT/US2017/035906, dated Dec. 20, 2018, 6 pages.

* cited by examiner

VEHICLE HITCH MOUNTED BICYCLE RACK

CROSS-REFERENCES TO RELATED APPLICATIONS

This application claims priority under 35 U.S.C. § 119(e) from U.S. Provisional Patent Application Ser. No. 62/345,840 filed Jun. 5, 2016, which is incorporated herein by reference.

INTRODUCTION

Popularity of recreational activities continues to grow, with corresponding growth and need for carrying recreational equipment and cargo on vehicles. Bicycles are one of the most common types of cargo routinely carried on vehicles, and many different mount configurations are available. Hitch racks are particularly popular because bicycles may be carried at a relatively low level and are easily assessable for people of all sizes. Hitch racks are also beneficial for carrying multiple bicycles on a single rack. For example, see U.S. Pat. No. 8,113,398, which is hereby incorporated by reference.

One of the problems with conventional hitch racks, particularly in view of the growing diversity in bicycle geometries and design configurations, is that adjacent bicycles may interfere with each other due to conflicting sizes geometrics, or other bicycle features, and/or because the bicycle mounts are simply too close. There is a need for more versatile bicycle racks that are accessible, easy to use, and adaptable to carry numerous bicycles in a compact and secure arrangement.

DETAILED DESCRIPTION

This disclosure provides numerous selected examples of invented devices for carrying bicycles on or with a vehicle. Many alternatives and modifications which may or may not be expressly mentioned, are enabled, implied, currently possessed, and are supported by the disclosure.

Figure 1:
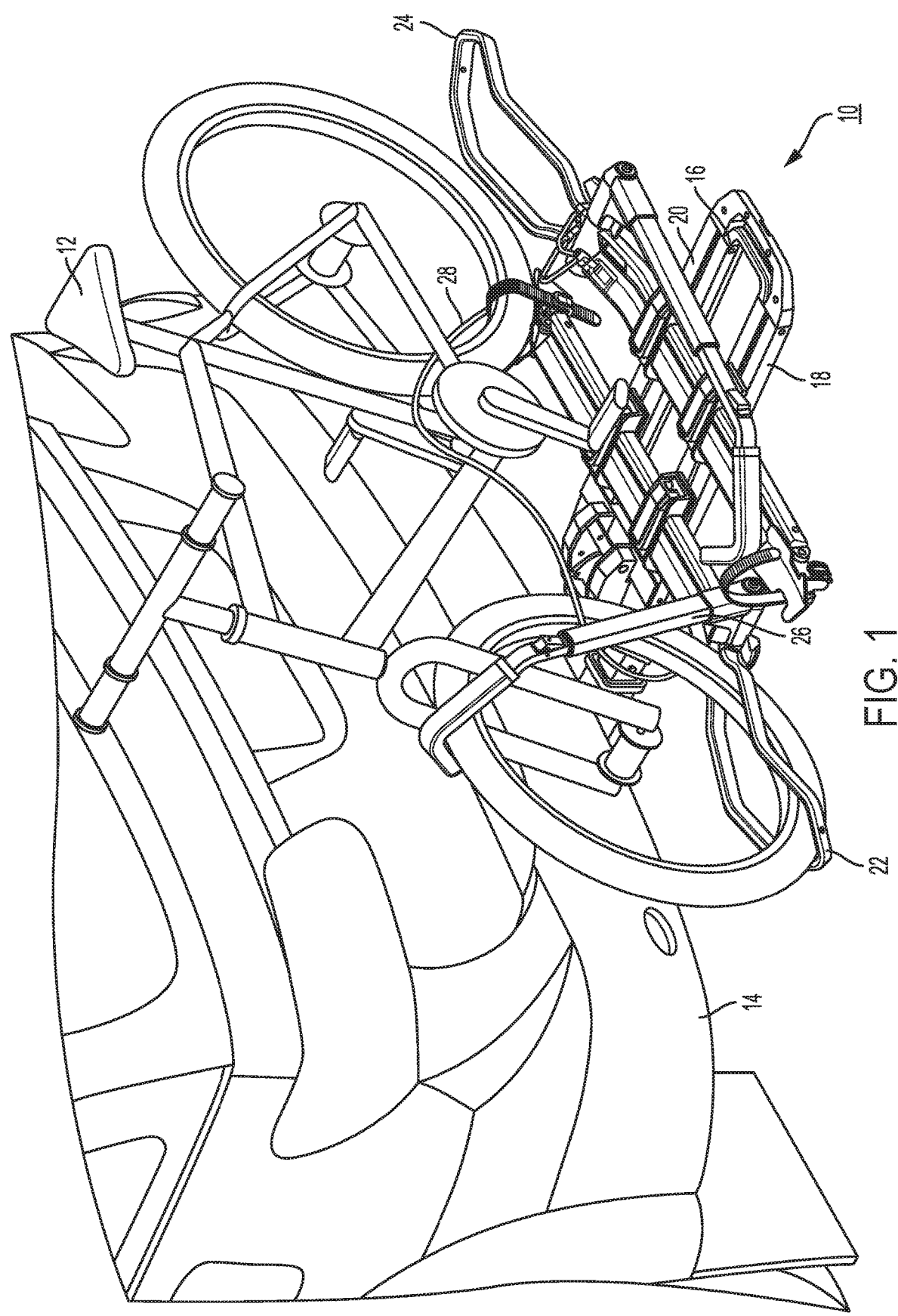
FIG. 1 is a perspective view of a rack according to aspects of the present disclosure, hitch mounted to a vehicle and carrying a bicycle.

FIG. 1 shows an example of a rack generally indicated at 10, carrying a bicycle 12 and mounted on a vehicle 14. The rack includes a frame 16 with a first beam 18 and a second beam 20. Coupled to the frame are two bike mounts, an inner bike mount 22 and an outer bike mount 24. Bicycle 12 is secured to inner bike mount 22 by an arm 26 and locked by a cable lock 28.

In some examples, frame 16 may include only one beam. In other examples, the frame may include crossbars, reinforcing members, or additional beams. One or more bike mounts may be coupled to the frame. Bicycle 12 may be secured to a bike mount by an arm or by other mechanisms, such as straps, fork mounts, or clamps. The bicycle may be locked by any appropriate type of lock, including a lock incorporated as part of the rack, a lock provided by the user, or the bicycle may be left unlocked.

Figure 2:
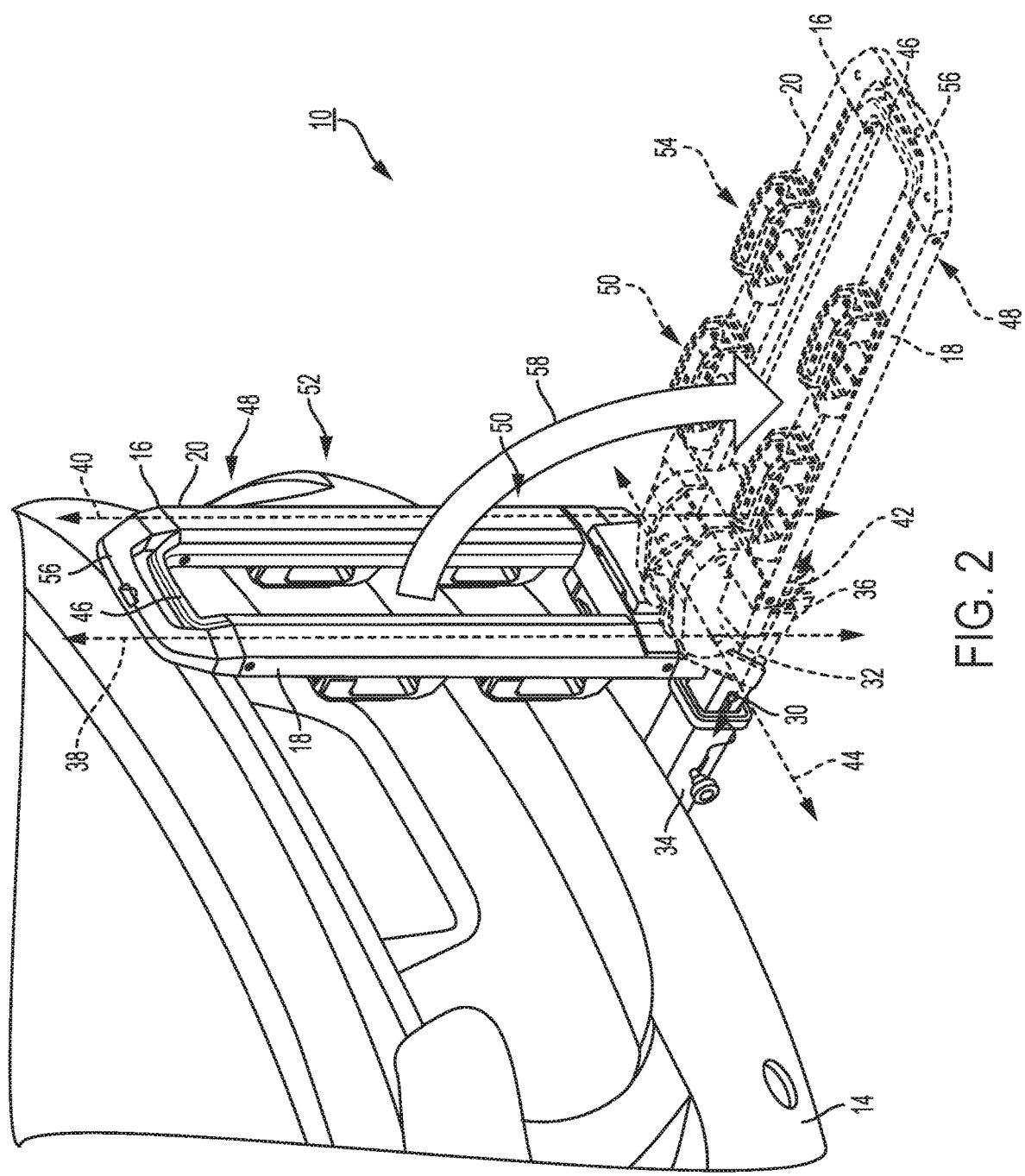
FIG. 2 is a perspective view of the frame portion of the rack of FIG. 1, in collapsed and carrying positions.

As shown more clearly in FIG. 2, the pictured example of frame 16 is coupled to a tongue 30 by a pivot assembly 32. Tongue 30 is secured in a hitch receiver 34 of vehicle 14, thereby mounting rack 10 to vehicle 14. The tongue may include any appropriate mechanism to retain the tongue securely in the hitch receiver. In the pictured example, tongue 30 includes a lock 36 as part of that mechanism. A user may thereby lock rack 10 to vehicle 14 to prevent theft or unauthorized removal of the rack.

Each beam 18, 20 of frame 16 has an elongate beam axis 38, 40, with beam axis 40 being parallel to beam axis 38. Tongue 30 has a long axis 42, and pivot assembly 32 defines a pivot axis 44 substantially perpendicular to beam axis 38. Tongue 30 pivots relative to frame 16 about pivot axis 44. Frame 16 may also be described as pivoting relative to tongue 30 about pivot axis 44.

An actuator handle 46 is disposed at a distal end 48 of beams 18, 20 and configured to actuate pivot assembly 32 at a proximal end 50 of the beams. In other examples, actuator handle 46 may be replaced by other actuators such as a lever or button. When not actuated, pivot assembly 32 is engaged to secure frame 16 in position relative to tongue 30. When actuated, pivot assembly 32 releases and allows frame 16 to pivot relative to tongue 30.

In FIG. 2, frame 16 is shown in two of four possible positions, a collapsed position 52 and a carrying position 54. In collapsed position 52 rack 10 is partially folded up, with long axis 42 of tongue 30 forming an angle of 95 degrees with beam axis 38. In some examples, long axis 42 may form an angle with beam axis 38 that is between 90 and 100 degrees, or between 85 and 105 degrees. As shown, frame 16 is roughly parallel to a rear end of vehicle 14, in a position appropriate for travel with rack 10 mounted on vehicle 14 but with no bicycles secured to the rack. In such a position, rack 10 may have a smaller footprint and improved aerodynamic properties.

In carrying position 54, long axis 42 of tongue 30 forms an angle of 174 degrees with beam axis 38. In some examples, long axis 42 may form an angle with beam axis 38 that is between 170 and 180 degrees, or between 165 and 185 degrees. As shown, frame 16 is roughly perpendicular to the rear end of vehicle 14, and beam axis 38 may be parallel to the direction of travel of the vehicle. Carrying position 54 is appropriate for travel with rack 10 mounted on vehicle 14 and one or more bicycles secured to the rack.

A carrying handle 56 is mounted on beams 18, 20, distal of actuator handle 46. To transition rack 10 between collapsed position 52 and carrying position 54, a user may grasp actuator handle 46 and carrying handle 56 and pull the actuator handle into contact with the carrying handle, in a direction parallel to beam axis 38. Pivot assembly 32 may be thereby actuated and allow frame 16 to pivot relative to tongue 30.

The user may then use carrying handle 56 to pivot frame 16 in the direction indicated by arrow 58, from collapsed position 52 to carrying position 54. The user may also pivot frame 16 from carrying position 54 in a direction opposite that indicated by arrow 58, to collapsed position 52. Once frame 16 is in the desired position, the user may release actuator handle 46 to engage pivot assembly 32 and secure frame 16 in position relative to tongue 30.

Figure 3:
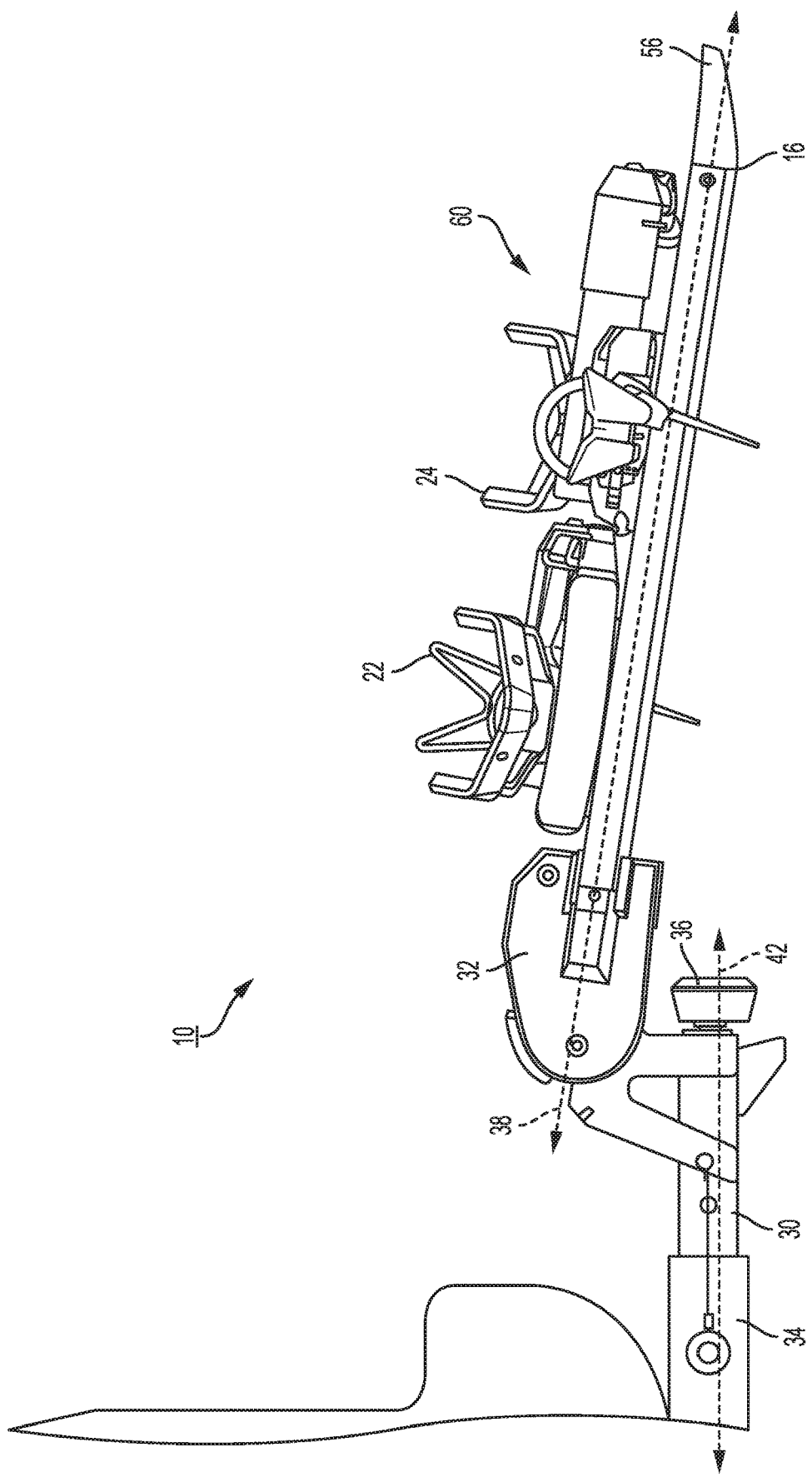
FIG. 3 is a side view of the rack of FIG. 1, in a clearance position.

FIG. 3 is a side view of rack 10 with frame 16 in a third of the four possible positions, a clearance position 60. In the clearance position, long axis 42 of tongue 30 and beam axis 38 form an upward facing angle of 203 degrees. In some examples, long axis 42 may form an angle with beam axis 38 that is between 200 and 210 degrees, or between 195 and 215 degrees. Clearance position 60 may be used when no bicycles are secured to rack 10, to aid in loading of bicycles. Alternatively clearance position 60 may be used when one or more bicycles are secured to rack 10, to facilitate access to a trunk or rear gate of vehicle 14. To transition rack 10 to clearance position 60 from carrying position 54, a user may grasp actuator handle 46 and carrying handle 56 to actuate pivot assembly 32, then pivot frame 16 in the direction indicated by arrow 58 in FIG. 2.

Figure 4:
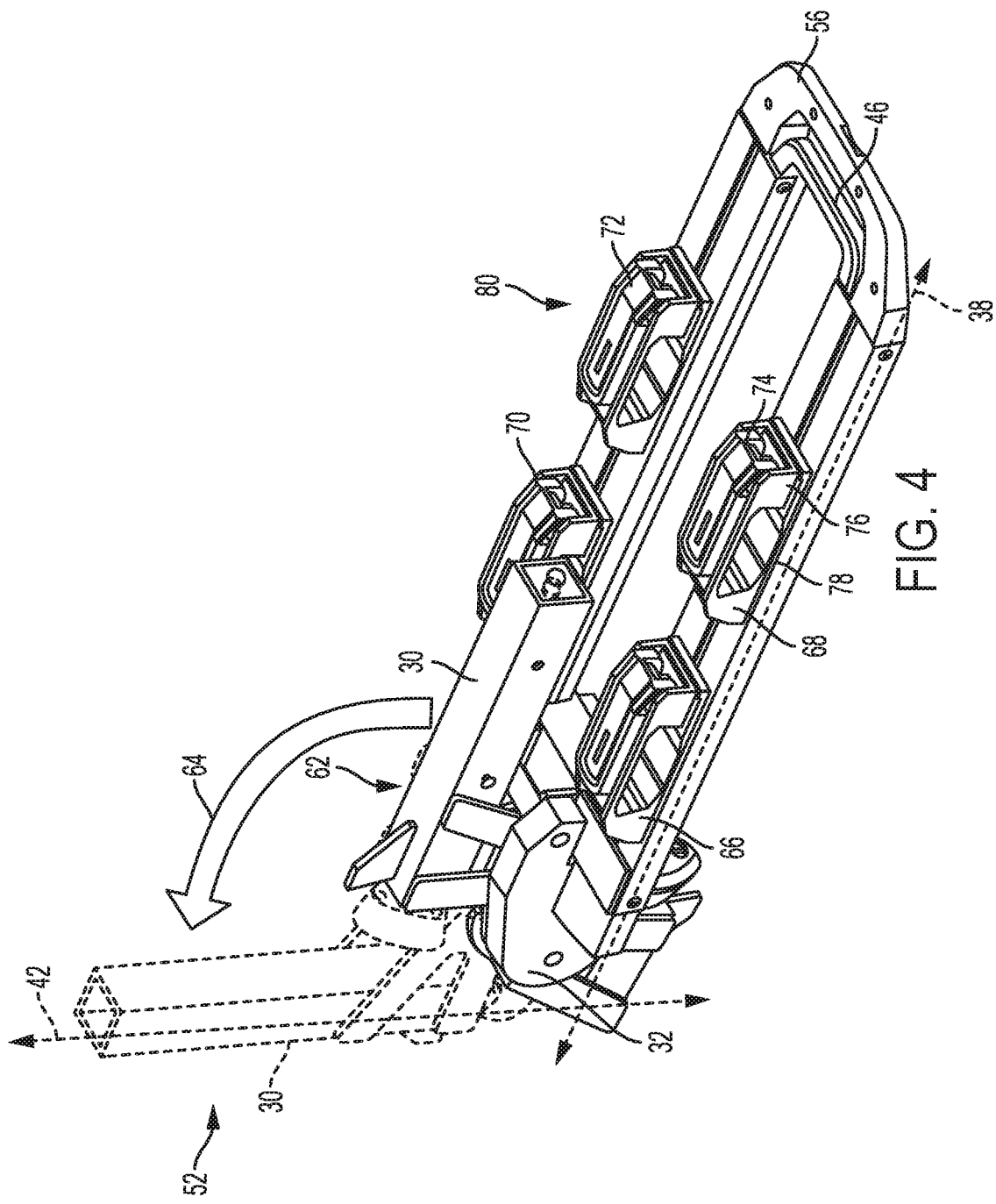
FIG. 4 is a perspective view of the frame portion of FIG. 2, in collapsed and storage positions.

FIG. 4 shows rack 10 not mounted on vehicle 14, in collapsed position 52 and a storage position 62. In the storage position, long axis 42 of tongue 30 forms an angle of 10 degrees with beam axis 38. In some examples, long axis 42 may form an angle with beam axis 38 that is between 5 and 15 degrees, may be parallel with the beam axis, or may form an angle up to 20 degrees. In some examples, the storage position may differ depending on whether bike mounts 22, 24 are installed on frame 16. Rack 10 is not configured to be mounted on vehicle 14 in storage position 62. Instead, the rack may be stored separate from the vehicle or shipped from a manufacturer. Rack 10 may occupy the least volume in storage position 62, and be more convenient to transport or package.

To transition rack 10 between collapsed position 52 and storage position 62, a user may grasp actuator handle 46 and carrying handle 56 to actuate pivot assembly 32. The user may then pivot tongue 30 opposite the direction indicated by arrow 64, from collapsed position 52 to storage position 62. The user may also pivot tongue 30 from storage position 62 in the direction indicated by arrow 64, to collapsed position 52 or further to carrying position 54. Once tongue 30 is in the desired position, the user may release actuator handle 46 to engage pivot assembly 32 and secure frame 16 in position relative to tongue 30.

In FIGS. 2 and 4, frame 16 is shown without bike mounts 22, 24, and in FIG. 3 is shown with bike mounts attached. It should be appreciated that frame 16 and tongue 30 may be pivoted between positions 52, 54, 62, and 60 as previously described whether or not bike mounts 22, 24 are attached to frame 16. In some examples, rack 10 may be configured to be pivoted between 5 or more positions, between only 2 positions, or frame 16 may be fixed in position relative to tongue 30. Configurations or positions of rack 10 may be used as disclosed above, or for any purpose related to use of the rack.

Frame 16 also includes four clamps, with two clamps 66, 68 attached to beam 18 and two clamps 70, 72 attached to beam 20. As shown in FIG. 4, each clamp includes a lever 74 and a clamp body 76 with an aperture 78 configured to receive a portion of bike mount 22 or 24. Clamps 66, 68, 70, 72 are shown in a closed position 80 in FIG. 4 and are shown in an open position 82 in FIG. 5.

Figure 5:
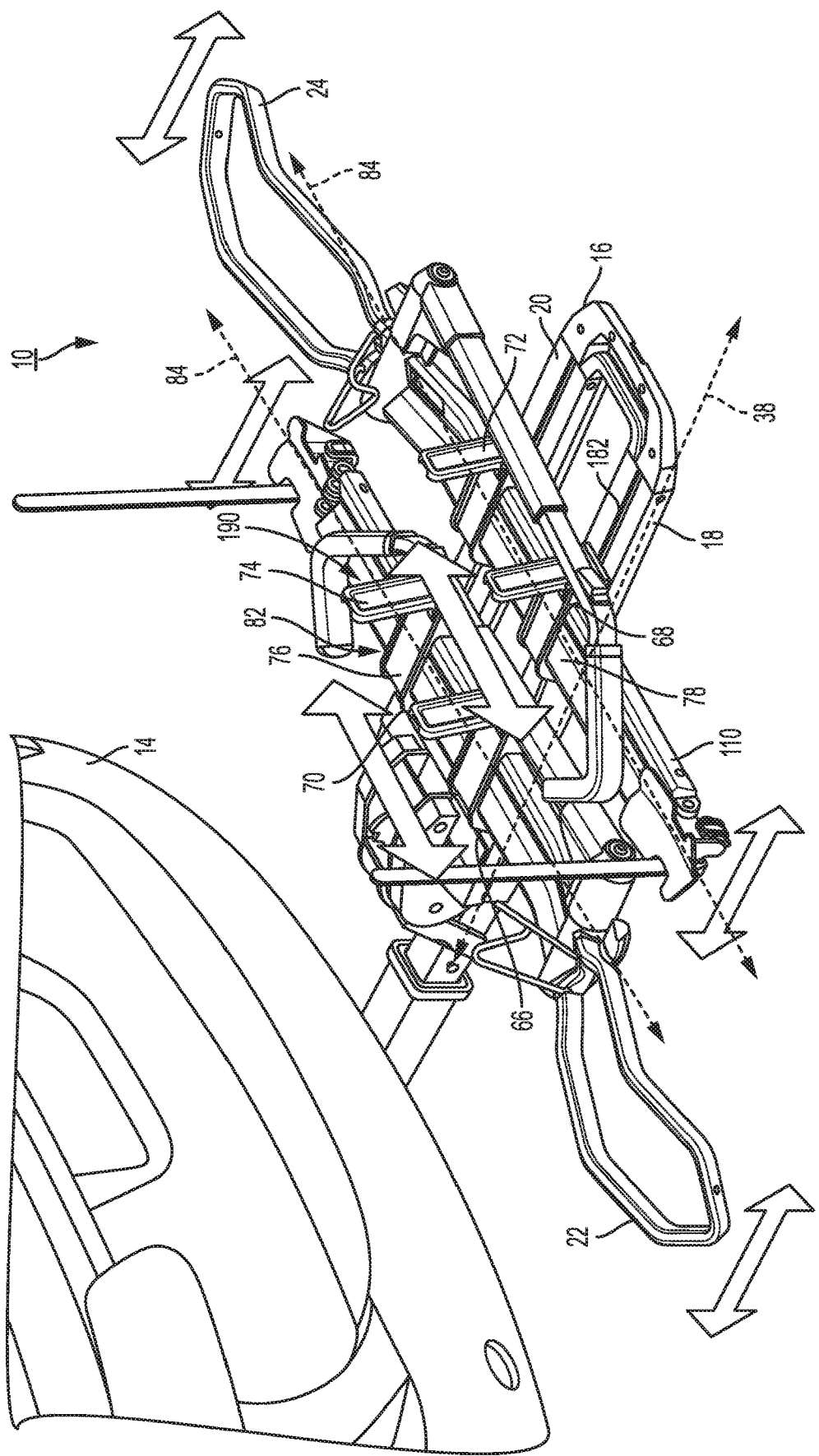
FIG. 5 is another perspective view of the rack of FIG. 1, illustrating range of motion of bike mounts in orthogonal directions with respect to the frame portion.

FIG. 5 shows rack 10 mounted on vehicle 14 with bike mount 22 received in clamps 66, 70 and bike mount 24 received in clamps 68, 72. Each bike mount has a long axis 84, and is mounted to frame 16 such that long axis 84 is perpendicular to beam axis 38. Bike mount 22 is attached to beam 18 by clamp 66 and to beam 20 by clamp 70. Bike mount 24 is attached to beam 18 by clamp 68 and to beam 20 by clamp 72. When in closed position 80, a clamp fixes a bike mount to a beam and prevents the clamp or the bike mount moving relative to the beam. For example, in closed position 80 clamp 66 fixes bike mount 22 to beam 18.

When in open position 82, a clamp allows a bike mount to move in two orthogonal directions relative to a beam. The bike mount slides through aperture 78 of the clamp in a first direction and a combination of the bike mount and the clamp slide along the beam in a second orthogonal direction. Rack 10 may include any number of clamps, disposed in any effective configuration. In some examples, each bike mount may be fixed to frame 16 by one clamp. In other examples, bike mount 22 may be fixed to frame 16 by one clamp and bike mount 24 may be fixed to the frame by two clamps. The clamps may be of any shape, and actuated by any mechanism. In some examples, more than one type of clamp may be included. Clamps may be preferred that can be operated without the use of tools. It may also be preferable that clamps are mounted to frame 16 in a manner limiting the possible range of motion, and preventing a clamp from sliding free of frame 16.

In the example shown in FIG. 5, because each bike mount is attached to both beams 18, 20 and the beams are fixed relative to one another, two clamps must be in an open position in order for a bike mount to move. For example, when both clamps 66, 70 are in open position 82, bike mount 22 is permitted to move in a direction parallel to beam axis 38 and in a direction perpendicular to beam axis 38 relative to beams 18, 20. When clamp 66 is in open position 82 but clamp 70 is in closed position 80, bike mount 22 is fixed to beam 20 and thereby prevented from moving relative to beam 20 or relative to beam 18.

Bike mounts 22, 24 may be adjusted simultaneously or separately. For example, all four clamps 66, 68, 70, 72 may be in open position 82 and bike mounts 22, 24 may both be adjusted distally on frame 16. For another example, clamps 66, 70 may be in closed position 80 and fix bike mount 22 relative to frame 16, while clamps 68, 72 may be in open position 82 and allow bike mount 24 to be adjusted in either direction.

A user of rack 10 may utilize the variety of adjustment options in any desired manner to facilitate placing and securing bicycles on the rack. For example, the user may open all four clamps, adjust both bike mounts, and then close all four clamps before placing any bicycles on the rack. Alternatively, the user may adjust inner bike mount 22, close clamps 66, 70, and secure a first bicycle to the inner bike mount, then secure a second bicycle to outer bike mount 24, adjust the outer bike mount for a best fit between the first and second bicycles, and close clamps 68, 72.

Figure 6:
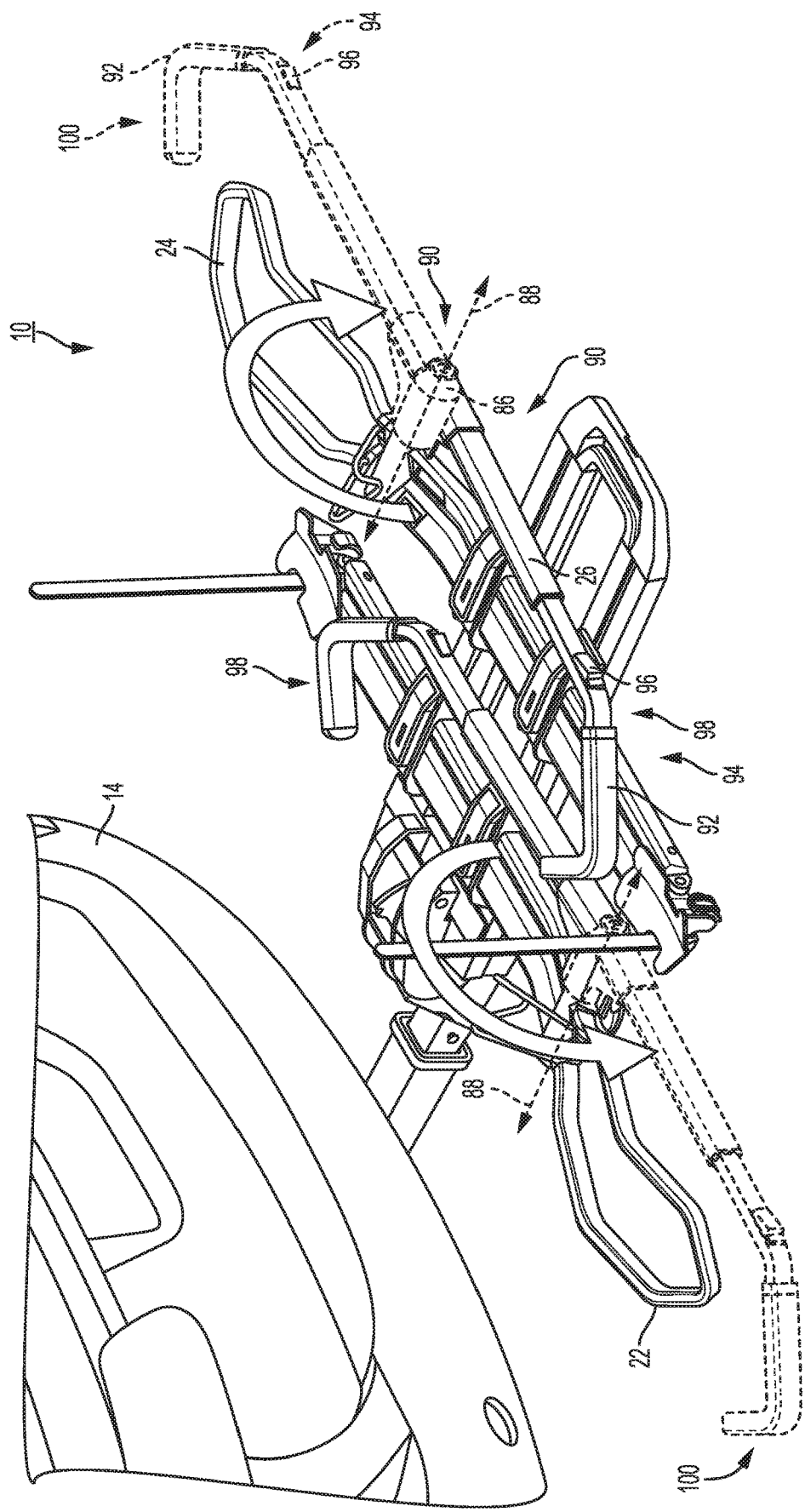
FIG. 6 is another perspective view of the rack of FIG. 1, illustrating range of motion of pivoting arms.

FIG. 6 illustrates the range of motion of arms 26 of bike mounts 22, 24. Each arm 26 includes a hub 86 defining a pivot axis 88 at a proximal end 90, and a hook 92 at a distal end 94. The hook is received in a ratchet mechanism with a release 96, allowing the arm to be adjusted to a plurality of discrete length settings. In other examples, arm 26 may include other mechanisms for securing a bicycle wheel to rack 10, or may adjust length by another mechanism or in a continuous manner.

Arm 26 pivots about pivot axis 88 of hub 86, from a folded position 98 to an extended position 100. The arm may traverse an angle of roughly 180 degrees from the folded to the extended position, or may traverse any appropriate angle. Arm 26 swings freely, resisted only by frictional forces in hub 86. The hub is configured to provide a selectable level of friction, to adjust the force required to pivot arm 26. The level of friction may be selected from a plurality of discrete settings, or may be continuously adjustable. In some examples, a pivot without adjustable setting may be included, or any effective coupling of arm 26 to the bike mount.

Arm 26 is configured to secure a bicycle to a bike mount, as shown in FIG. 1. For example, a user of rack 10 may swing arm 26 into extended position 100 prior to placing a bicycle on bike mount 22. The user may then swing arm 26 back toward folded position 98 until hook 92 is above a front wheel of the bicycle. The ratcheting mechanism of arm 26 may be employed by pressing down on hook 92 until the front wheel is held firmly. To remove the bicycle, the user may engage release 96 and pull upward on hook 92 until the hook is clear of the front wheel. The user may then swing arm 26 to extended position 100, clear of the bicycle.

Figure 7:
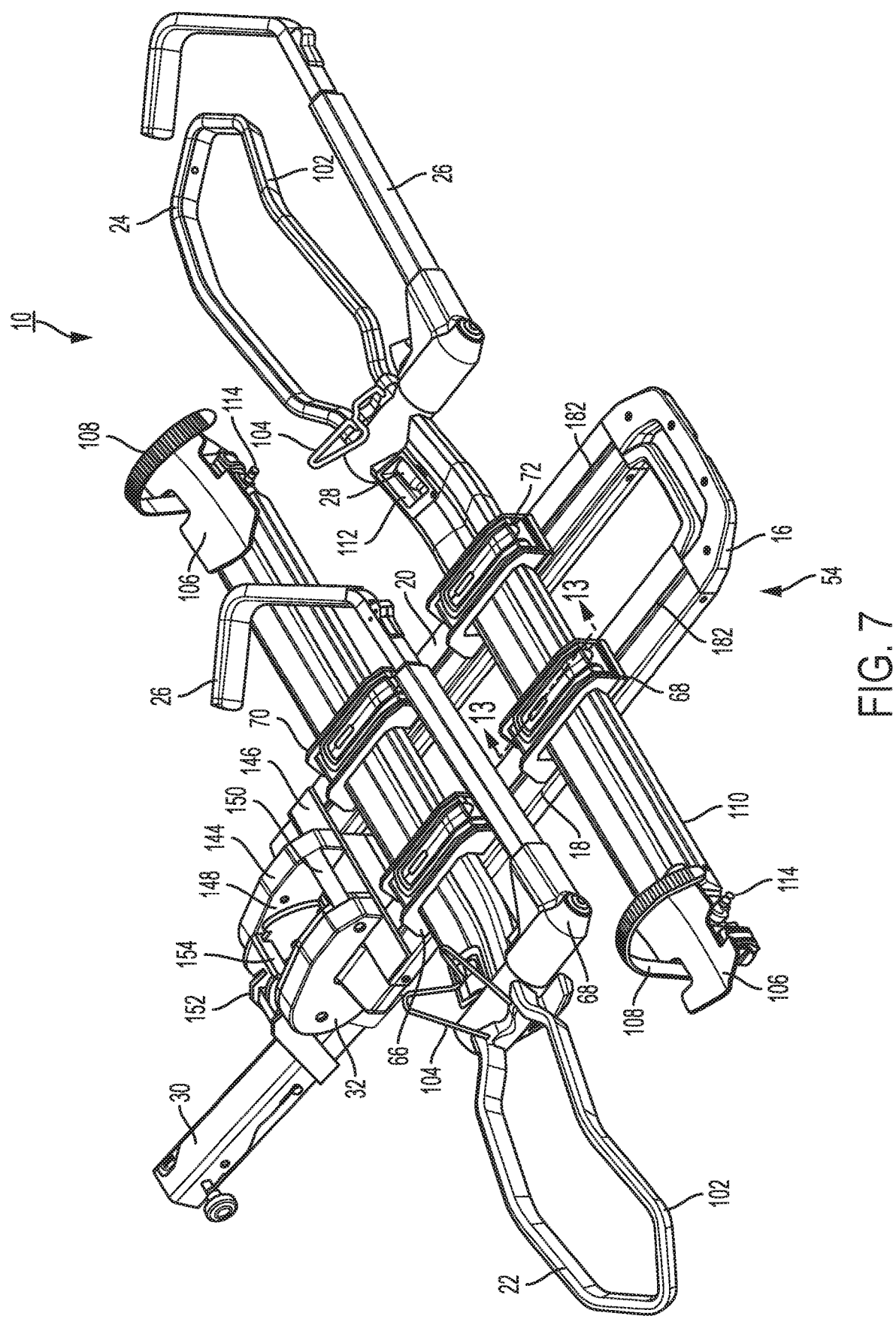
FIG. 7 is another perspective view of the rack of FIG. 1.

FIG. 7 shows a perspective view of rack 10, not mounted on a vehicle and without bicycles. Bike mounts 22, 24 are attached to frame 16 by clamps 66, 68, 70, 72, and the frame is in carrying position 54. Each bike mount 22, 24 includes a front wheel mount and a rear wheel mount. The bike mounts are attached to frame 16 such that the front wheel mount of bike mount 22 is proximate the rear wheel mount of bike mount 24. Such alternation of orientation may help to reduce interference between secured bicycles. In the pictured example the front wheel mount includes a hoop 102 with a wheel chock 104 and the rear wheel mount includes a wheel cup 106 with a ratcheting strap and buckle mechanism 108. In other examples, both front and rear wheel mounts may include a hoop, the front wheel mount may be replaced by a fork mount, or any mechanism for supporting and securing a bicycle may be included.

As shown in FIG. 7, a tray 110 extends through two clamps 66, 70 or 68, 72, connecting wheel cup 106 and hoop 102. Hub 86 of arm 26 is disposed at an end of hoop 102. Tray 110 is hollow, and cable lock 28 extends through the tray when not in use. A connecting end of cable lock 28 is accessible in a recess 112 of tray 110 proximate hub 86. The connecting end is configured to mate with a locking pin 114 extending from a base of wheel cup 106. A user may lock a secured bicycle by withdrawing cable lock 28 from tray 110 through recess 112, passing the cable through the bicycle and mating the connecting end with locking pin 114. In some examples, rack 10 may include an integrated u-lock or chain lock. Locking pin 114 may also be configured to mate with a lock provided by a user.

Figure 8:
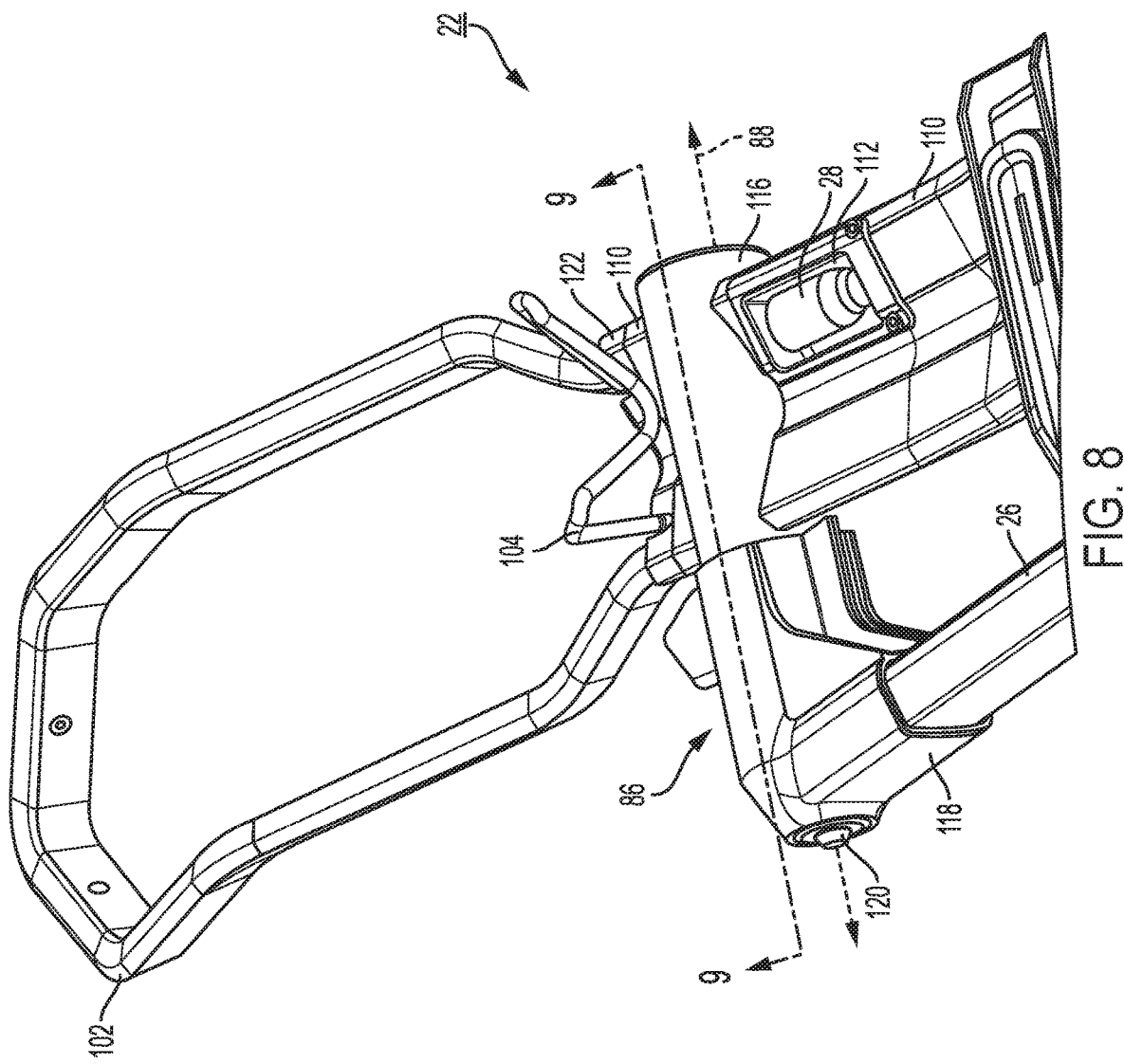
FIG. 8 is a perspective view of an end of one bike mount of the rack of FIG. 7.

FIG. 8 is a view of bike mount 22 looking toward hoop 102, which shows hub 86 more clearly. The hub includes a hub shell 116 with a first end received in an elbow sleeve 118. Proximal end 90 of arm 26 is also received in elbow sleeve 118, and retained by pivot bolt 120. An end of tray 110 extends through an aperture in hub shell 116, and out past the hub shell. A plug 122 is configured to fit snugly into the end of tray 110. Plug 122 receives two ends of hoop 102 and two ends of wheel chock 104, closing off the end of tray 110 and connecting hoop 102 and wheel chock 104 to the tray. In some examples, hoop 102 and wheel chock 104 may connect directly to tray 110, or to hub shell 116. Tray 110 may be solid, or closed at one or both ends.

Figure 9:
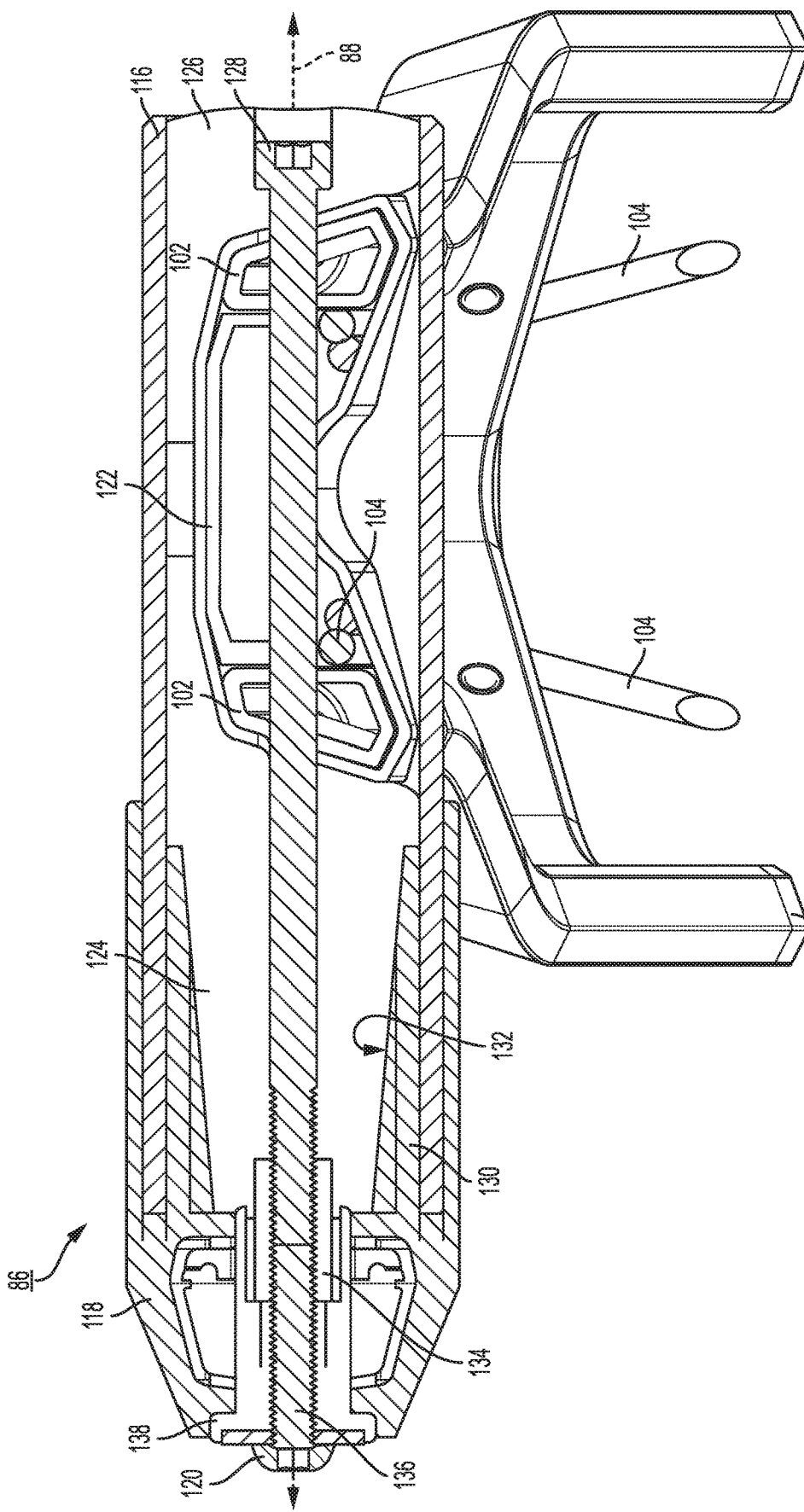
FIG. 9 is a cross sectional view of a hub assembly of the bike mount of FIG. 8, taken along lines 9-9 of FIG. 8.

FIG. 9 is a cross-sectional view of hub 86, taken along lines 9-9 in FIG. 8. In addition to hub shell 116 and elbow sleeve 118, the hub includes a cone wedge 124, a wedge 126, and a wedge bolt 128. Hub shell 116 is generally cylindrical in shape, with a first end received between an outer sleeve of elbow sleeve 118 and a cylindrical projection 130 with a conical interior surface 132. Interior surface 132 and cone wedge 124 are shaped as complementary cones, such that cone wedge 124 may be received in the cylindrical projection of elbow sleeve 118. Wedge 126 is received in a second end of hub shell 116, with tray 110 extending through the hub shell between cone wedge 124 and wedge 126.

Corresponding apertures in cone wedge 124, tray 110, hoop 102, plug 122, and wedge 126 are aligned to allow wedge bolt 128 to extend entirely through hub shell 116 to a coupler nut 134. Pivot bolt 120 extends through a washer 136 and a housing 138 in elbow sleeve 118, to coupler nut 134. Pivot bolt 120 and wedge bolt 128 are coupled by coupler nut 134, such that turning the pivot bolt causes the wedge bolt to turn also. Together pivot bolt 120 and wedge bolt 128 define pivot axis 88 of hub 86.

A flanged head of wedge bolt 128 in a recess of wedge 126 retains the wedge in hub shell 116 and against track 110. The wedge bolt also retains track 110, plug 122, and hoop 102 in hub shell 116. A flange of pivot bolt housing 138 tensioned by pivot bolt 120 retains elbow sleeve 118 on hub shell 116. Pivot bolt 120 also compresses conical interior surface 132 of elbow sleeve 118 against cone wedge 124.

Contact between interior surface 132 and cone wedge 124 causes frictional resistance to a pivoting movement of arm 26. Tightening or loosening pivot bolt 120 changes the friction between the interior surface and cone wedge, thereby adjusting the frictional resistance to the pivoting movement of arm 26. That is, hub 86 is configured to provide a selective level of friction resistance, which is selected by adjustment of pivot bolt 120. A user may adjust the pivot bolt until swinging arm 26 requires a comfortable level of force, and the arm is neither too loose or too stiff for their preference.

Figure 10:
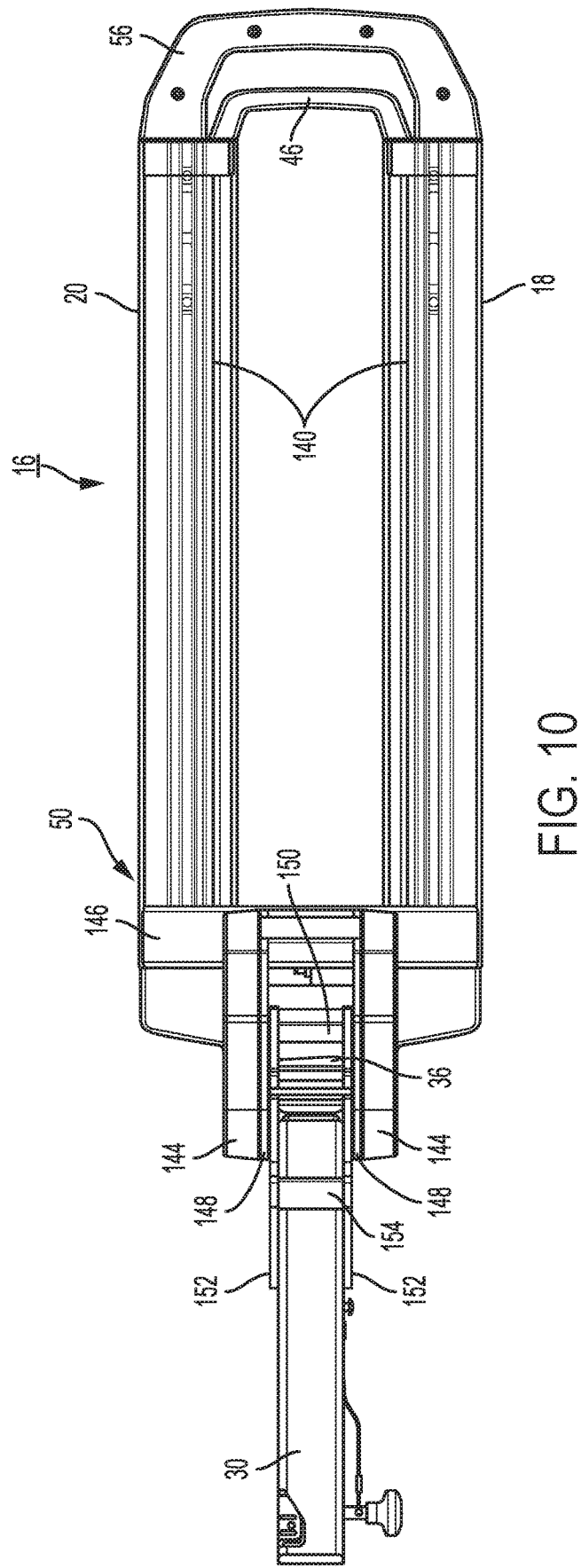
FIG. 10 is a partially transparent top view of the frame portion of the rack of FIG. 7.
Figure 11:
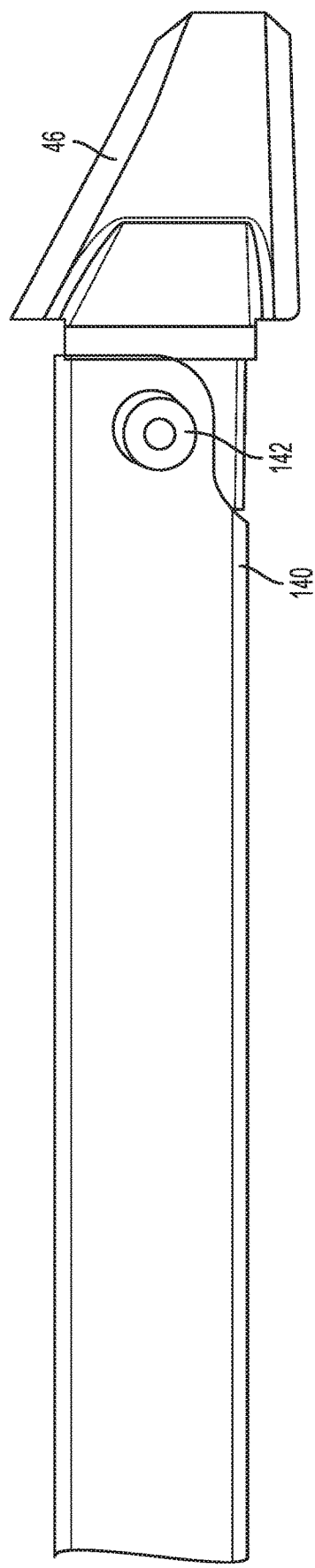
FIG. 11 is a side view of an actuator of the frame portion of FIG. 10.

FIG. 10 is a top view of frame 16, showing beams 18, 20 as transparent. A link member 140 extends through each beam, from actuator handle 46 to pivot assembly 32. When a user grasps actuator handle 46 and carrying handle 56, and pulls the actuator handle into contact with the carrying handle, actuator handle 46 pulls on both links 140. As shown in FIG. 11, actuator handle 46 has a lateral projection 142 at each side. Each link 140 has a corresponding first aperture at a first end to receive a lateral projection 142, and thereby couple the link to actuator handle 46.

Returning to FIG. 7, pivot assembly 32 includes two outer covers 144 and a beam cap 146 that receives proximal ends 50 of beams 18, 20. The pivot assembly further includes two side plates 148 fixed together, but held at a distance from one another by braces 150. A recess in side plates 148 receives beam cap 146, and the side plates are fixed to the beam cap. Similarly, two tilt lock arms 152 disposed between the side plates are spaced from one another by braces 154. Tongue 30 is disposed between tilt lock arms 152, and fixed to the arms.

Figure 12:
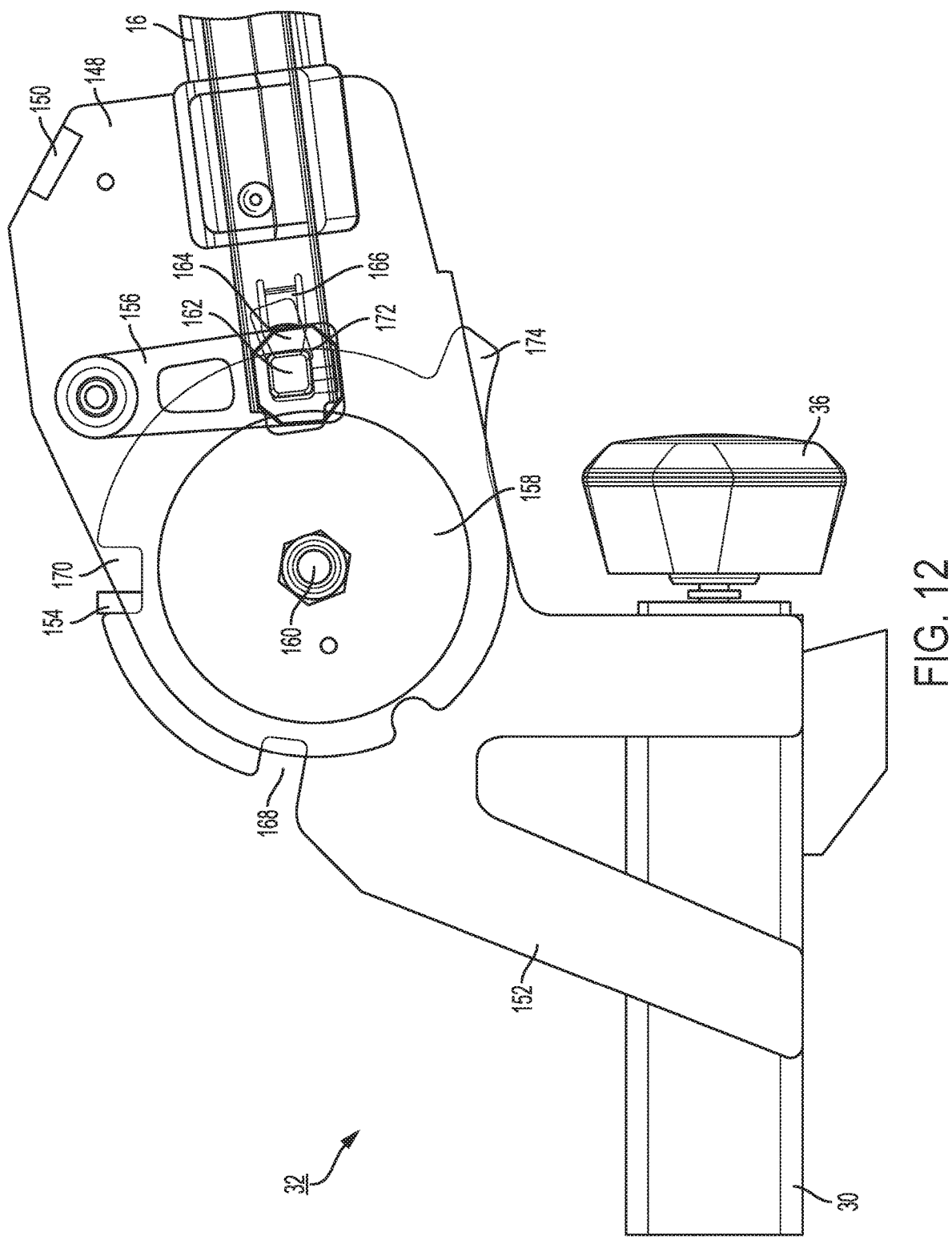
FIG. 12 is a partially transparent side view of a pivot assembly of the rack of FIG. 7.

FIG. 12 is a side view of pivot assembly 32 without outer covers 144 or beam 18. Side plate 148 is shown as transparent, as are a second end of link 140 and a pin arm 156. Side plate 148 overlaps tilt lock arm 152 in a roughly circular area, with a circular bushing 158 disposed between the two. Side plate 148 pivots relative to tilt lock arm 152 about a pivot bolt 160, which defines pivot axis 44 of pivot assembly 32.

A square tilt lock pin 162 extends parallel to pivot bolt 160 through an aperture in side plate 148. The aperture is an arc-shaped track 164 that partially overlaps tilt lock arm 152. Pin 162 also extends through a second aperture 166 in link 140 such that when link 140 is pulled by actuator handle 46, link 140 pulls on pin 162. The pin is pulled along track 164, away from tilt lock arm 152. Pin arm 156 pivots to guide pin 162 along track 164, and the pin is configured to rotate slightly relative to link 140 as the pin follows the curve of the track. Pivot assembly 32 may include a spring to urge pin 162 toward tilt lock arm 152, when not pulled on by link 140. In some examples, pin 162 may have a rounded shape and track 164 may be rectangular. In such examples, pivot assembly 32 may not include pin arm 156. In other examples, link 140 may be fixed to pin 162.

Tilt lock arm 152 includes three lock slots 168, 170, 172 and a rotation stop 174. Each lock slot is configured to receive pin 162. When the pin is received in a lock slot, as shown in FIG. 12, side plate 148 is prevented from pivoting relative to tilt lock arm 152. Therefore in turn, frame 16 is prevent from pivoting relative to tongue 30. In other words, when pin 162 is received in a lock slot, pivot assembly 32 is not actuated and is engaged to secure frame 16 in position relative to tongue 30.

When a user pulls on actuator handle 46, link 140 pulls pin 162 out of a lock slot along track 164. The user may then pivot frame 16 to align with another lock slot and release actuator handle 46 to secure the frame. Each lock slot corresponds to a position of rack 10. That is, when pin 162 is received in lock slot 168, rack 10 is in storage position 62. Similarly, when pin 162 is received in lock slot 170, rack 1 is in collapsed position 52, and when pin 162 is received in lock slot 172, rack 10 is in carrying position 54.

Frame 16 may only pivot through a limited angle of roughly 180 degrees, or through other limited angles. Tilt lock pin 162 is prevented from pivoting past lock slot 168 by a projection of tilt lock arm 152. The pin may pivot past lock slot 172 up to rotation stop 174, which then prevents further pivoting of frame 16. When pin 162 is contact with rotation stop 174, rack 10 is in clearance position 60. Rack 10 is not secured in clearance position 60, and frame 16 may be pivoted back into carrying position 54 without pulling actuator handle 46 to engage pivot assembly 32.

Some users may place rack 10 in other unsecured positions by releasing actuator handle 46 when pin 162 is not aligned with a lock slot. In such a case, the user may pivot frame 16 until pin 162 aligns with and slots into a lock slot, thereby securing the frame in position. Pivot assembly 32 may include any effective pivot mechanism, that may be engaged and disengaged to secure frame 16 in position.

Figure 13:
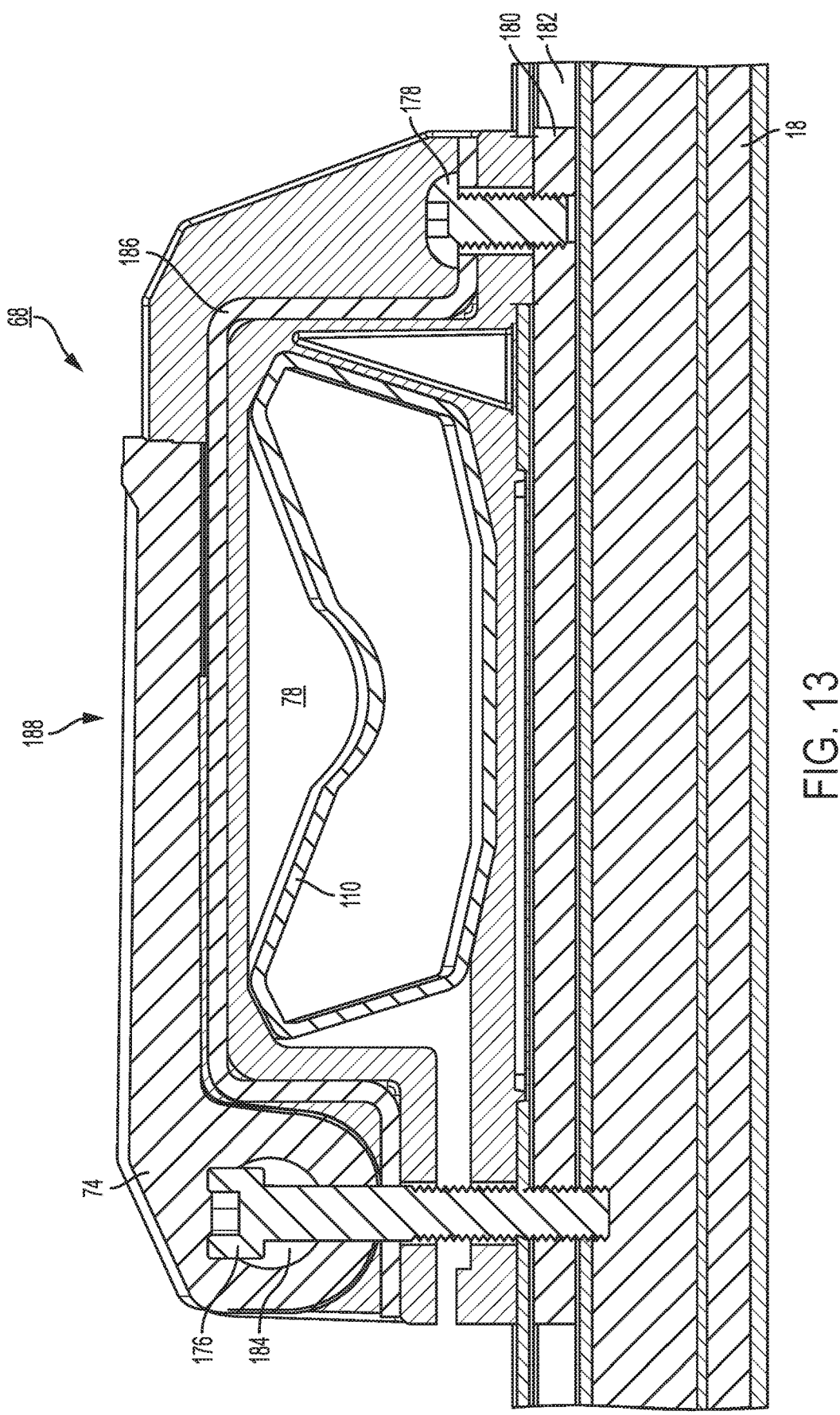
FIG. 13 is a cross sectional view of a clamp assembly of the rack of FIG. 7, taken along lines 13-13.

FIG. 13 is a cross sectional view of clamp 68, taken along lines 13-13 in FIG. 7. It should be appreciated that clamps 66, 68, 70, 72 are matching, and therefore FIG. 13 may further illustrate any of the four clamps and either of beams 18, 20. As shown in FIG. 13, clamp body 76 has a cross section that is roughly c-shaped about aperture 78, with cam lever 74 disposed at the open end of the c-shape.

Clamp body 76 is anchored by two anchor bolts 176, 178 to an anchor plate 180. The anchor plate is received in a t-shaped slot 182 extending along an upper face of beam 18. A more complete extent of slot 182 can be seen in FIG. 7. Anchor plate 180 is configured to slide along slot 182, but to be trapped in the slot. Anchor plate 180 has two apertures aligned to receive anchor bolts 176, 178. The anchor bolts extend through slot 182, and bolt 178 extends into anchor plate 180 while bolt 176 extends through the anchor plate. Any appropriate number of bolts may be included, or other fasteners used. Clamp body 76 may include a protrusion or other feature that extends into slot 182, to facilitate smooth travel along the slot. In some examples, slot 182 may include bearings to reduce frictional resistance on anchor plate 180. In other examples, anchor plate 180 may be formed as part of clamp body 76.

Returning to FIG. 13, tray 110 extends through aperture 78. The aperture is configured to receive the tray, and allow the tray to slide relative to the clamp. Aperture 78 conforms closely to some surfaces of tray 110, but is spaced from others. In some examples, the aperture may have a square shape, or any other shape providing sufficient contact with tray 110.

Cam lever 74 is mounted on a lever bar 184, which defines an axis of rotation for the lever. Lever bar 184 is fixed to anchor bolt 176, which extends through the bar. Clamp plate 186 extends through clamp body 76 to provide additional rigidity, and is fastened by anchor bolts 176, 178. Cam lever 74 has a clamped position 188 in engagement with clamp plate 186, and a released position 190 not in contact with the clamp plate.

In released position 190, as shown in FIG. 5, cam lever 74 is at an angle to beam 18. Forces on clamp body 76 and tray 110 are limited, and therefore anchor plate 180 is free to slide along slot 182 and tray 110 is free to slide within aperture 78. That is, bike mount 24 may be adjusted in a direction parallel to beam 18 by sliding anchor plate 180 of clamp 68 along slot 182 of the beam. Bike mount 24 may also be adjusted in a direction perpendicular to beam 18 by sliding tray 110 of the bike mount through aperture 78 of clamp 68.

In clamped position 188, as shown in FIG. 13, cam lever 74 is generally parallel to beam 18. Cam lever 74 tensions clamp body 76 relative to anchor bolt 176, contacting the anchor bolt against an inside surface of slot 182 and fixing clamp body 76 against beam 18. The c-shape of clamp body 76 is also changed by cam lever 74, tightening aperture 78 about tray 110 and fixing the tray relative to the clamp. Therefore, bike mount 24 is fixed to beam 18 and clamp 68 does not permit movement relative to the beam, either perpendicular or parallel to the beam.

Figure 14:
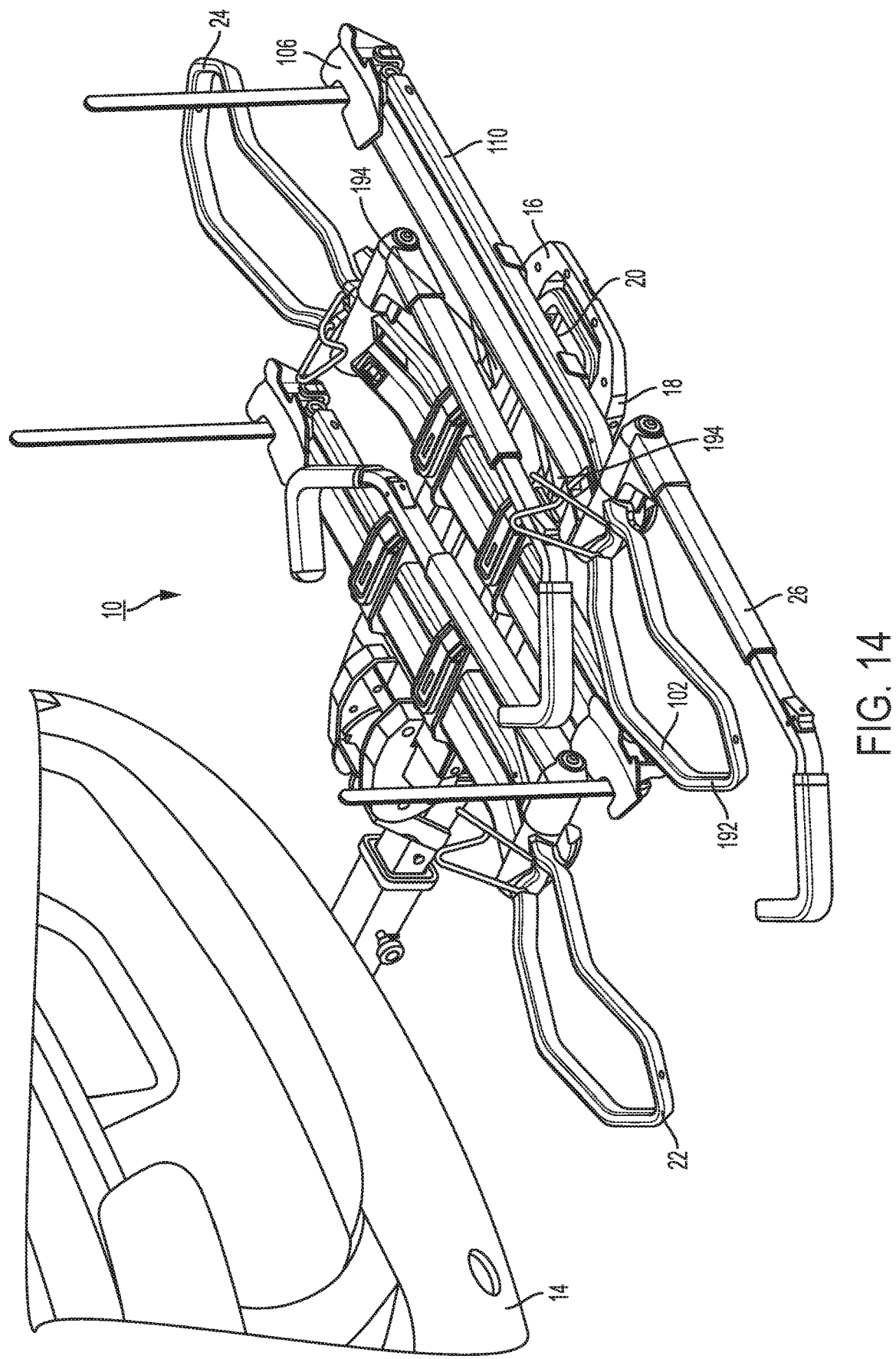
FIG. 14 is a perspective view of the rack of FIG. 1, hitch mounted to a vehicle and further including a third bike mount.

FIG. 14 shows rack 10 with an optional third bike mount 192. The third bike mount may be factory installed on rack 10, or may be added by a user of rack 10 as needed to transport an additional bicycle. The third bike mount may match bike mounts 22, 24, or may be of a different type. In the pictured example, third bike mount 192 also includes a tray 110, arm 26, hoop 102, and wheel cup 106. However, bike mount 192 is attached to two legs 194 spaced to correspond to beams 18, 20.

Legs 194 support tray 110, and are fixed to the tray. Legs 194 and beams 18, 20 include corresponding apertures and screws extending through the corresponding apertures fix bike mount 192 to frame 16 of rack 10. The legs may be configured to attach to frame 16 in any effective manner, such as with clamps, snap-fit components, or other fasteners. In some examples, tray 110 may be slidably coupled to legs 194, allowing adjustment of third bike mount 192 perpendicular to beam axis 38.

Figure 15:
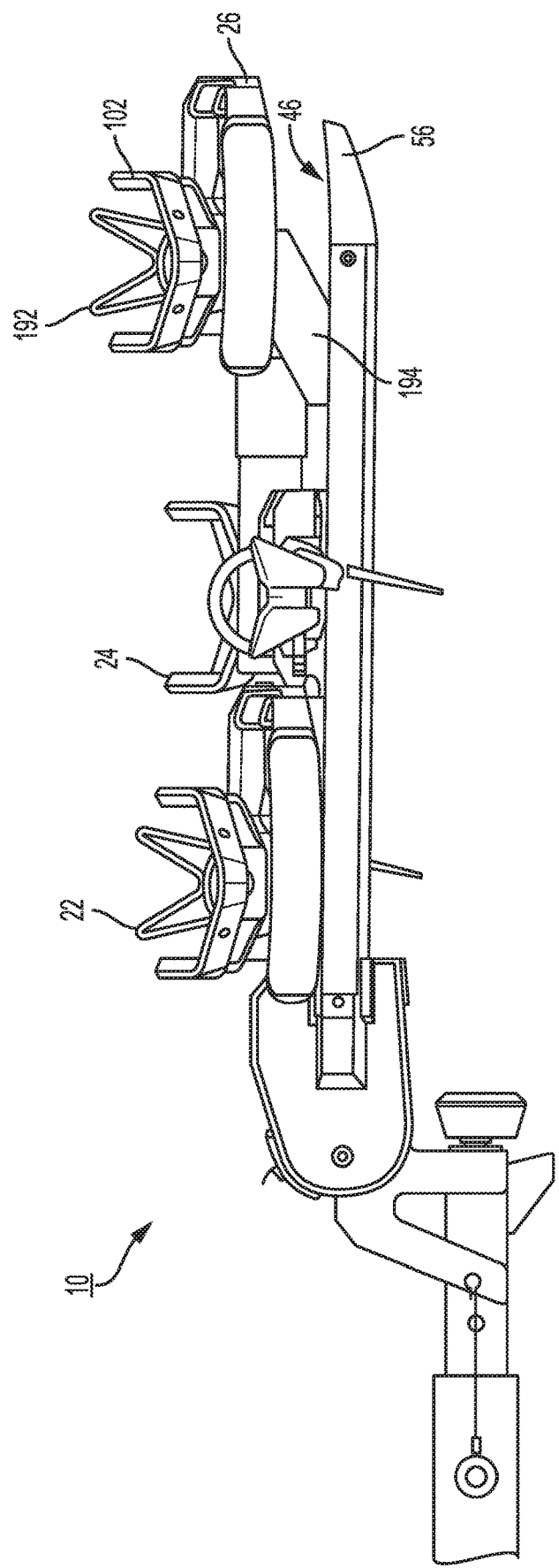
FIG. 15 is a side view of the rack of FIG. 13.

As shown in FIG. 15, legs 194 elevate third bike mount 192 about 2 inches from bike mounts 22, 24. In other examples, the elevation may be as much as 3 inches, or any appropriate height. Third bike mount 192 is disposed above actuator handle 46 and carrying handle 56. The elevation preserves access to the handles, allowing a user to reach under the third bike mount to actuate pivot assembly 32 and transition rack 10 between positions.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular embodiment should be interpreted to be compatible with any other embodiment, alternative, modification, or variance.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A rack for carrying a bicycle on a vehicle, comprising:
a tongue portion configured for attachment to a hitch receiver behind a vehicle,
a first beam structure connected to the tongue portion, the first beam structure having an elongate axis parallel with the direction of vehicle travel when the first beam structure is in a use position,
a first bike mount having a long axis,
a first clamp assembly securing the first bike mount to the first beam structure wherein the long axis of the first bike mount is perpendicular to the elongate axis of the first beam structure, the first clamp assembly having an actuator positioned above a remainder of the first clamp assembly configured to move the first clamp assembly between a closed position and an open position, the first bike mount being fixed to the first beam structure when the first clamp assembly is in the closed position, the first clamp assembly permitting movement of the first bike mount, relative to the first beam structure, in a first direction and a second direction orthogonal to the first direction when the first clamp assembly is in the open position, and
the first clamp assembly having a clamp body, a first end of the clamp body fixedly connected by a first bolt to an anchor plate, a second end of the clamp body connected by a second bolt to the anchor plate, the actuator having an actuator arm pivotally mounted on a head portion of the second bolt, such that upon actuation by the actuator, the second bolt moves vertically through an aperture of the clamp body, between a first position and a second position corresponding to the closed position and the open position respectively of the first clamp assembly.

2. The rack of claim 1, further comprising:
a second beam structure connected to the tongue portion, the second beam structure being parallel to the first beam structure, and
a second clamp assembly securing the first bike mount to the second beam structure, the second clamp assembly having a closed position and an open position, the first bike mount being fixed to the first beam structure when the second clamp assembly is in the closed position, the second clamp assembly permitting movement of the first bike mount, relative to the first beam structure, in the first direction and the second direction when the clamp assembly is in the open position.

3. The rack of claim 2, further comprising:
a second bike mount having a long axis parallel to the long axis of the first bike mount,
a third clamp assembly securing the second bike mount to the first beam structure, the third clamp assembly having a closed position and an open position, the second bike mount being fixed to the first beam structure when the third clamp assembly is in the closed position, the third clamp assembly permitting movement of the second bike mount, relative to the first beam structure, in the first direction and the second direction when the clamp assembly is in the open position, and
a fourth clamp assembly securing the second bike mount to the second beam structure, the fourth clamp assembly having a closed position and an open position, the second bike mount being fixed to the second beam structure when the fourth clamp assembly is in the closed position, the third clamp assembly permitting movement of the second bike mount, relative to the first beam structure, in the first direction and the second direction when the clamp assembly is in the open position.

4. The rack of claim 3, further comprising:
a third bike mount configured for selectable mounting on a distal end portion of the beam structure, wherein the third bike mount is elevated relative to the first and second bike mounts when the third bike mount is connected to the first beam structure.

5. The rack of claim 1, wherein the tongue portion has a long axis and is configured to pivot relative to the beam structure, about an axis perpendicular to the elongate axis of the beam, wherein the rack has a collapsed position in which the long axis of the tongue portion and the elongate axis of the beam structure form an angle of less than twenty degrees.

6. The rack of claim 1, wherein the tongue portion has a long axis and is configured to pivot relative to the beam structure, about an axis perpendicular to the elongate axis of the beam, wherein the rack has a carrying position in which the long axis of the tongue portion and the elongate axis of the beam structure form an angle of between 160 degrees and 200 degrees.

7. The rack of claim 1, wherein the tongue portion has a long axis and is configured to pivot relative to the beam structure, about an axis perpendicular to the elongate axis of the beam, wherein the rack has a clearance position in which the long axis of the tongue portion and the elongate axis of the beam structure form an upward facing angle of greater than 200 degrees.

8. The rack of claim 1, wherein the actuator arm includes a cam lever configured to move from the closed position to the open position.

9. The rack of claim 1, wherein the first beam structure has a slot parallel to the elongate axis, the first clamp assembly engaging the slot and being configured to move along the slot when the first clamp assembly is in the open position, and alternately being fixed relative to the slot when the first clamp assembly is in the closed position.

10. The rack of claim 9, wherein the anchor plate is in a slidable engagement with the slot when the first clamp assembly is in the open position, and alternately in a fixed engagement with the slot when the first clamp assembly is in the closed position.

11. The rack of claim 1, wherein the first beam structure has a proximal end portion connected to the tongue portion, and a distal end portion, wherein an actuator located near the distal end portion is operable to enable pivoting of the first beam structure relative to the tongue portion.

12. The rack of claim 1, wherein the first bike mount has an arm pivotable about an axis parallel to the elongate axis of the first beam structure, the arm having a proximal end portion connected to the first bike mount via a hub structure, and a distal end portion including a hook member configured to contact a bike.

13. The rack of claim 12, wherein the hub structure includes a cone wedge configured to provide a selectable level of friction resisting pivoting movement of the arm.

14. The rack of claim 1, wherein the actuator includes a cam lever that pivots around an axis perpendicular to the elongate axis of the first beam structure.

15. The rack of claim 14, wherein in the closed position, a pivotable arm of the cam lever is received on a top surface of the clamp assembly.

16. The rack of claim 1, wherein the first clamp assembly encompasses the first bike mount.

17. The rack of claim 1, wherein the first beam structure has a longitudinal slot on a top side, the first clamp assembly being movable along the slot when the first clamp assembly is in the open position.

18. The rack of claim 1, further wherein the clamp body has a clamp plate extending through the clamp body, the clamp plate engaging the actuator in a clamped position and disengaging the actuator in a released position.

19. A rack for carrying bicycles on a vehicle, comprising:
a tongue portion configured for attachment to a hitch receiver behind a vehicle,
a first beam structure connected to the tongue portion, the first beam structure having an elongate axis parallel with the direction of vehicle travel when the first beam structure is in a use position, the first beam structure being pivotable about an axis perpendicular to the direction of vehicle travel, through a range of at least 100 degrees relative to the tongue portion,
a first bike mount having a long axis, the first bike mount being mounted on the first beam structure, the long axis of the first bike mount being perpendicular to the elongate axis of the first beam structure wherein the first bike mount is fully encompassed by a first clamp securing the first bike mount to the first beam structure,
the first clamp having an integral structure including a clamp body, an actuator operably connected to a first end of the clamp body through a bolt member movable in a vertical actuation path in the clamp body, to alternate between a closed position and an open position of the first clamp, and
wherein a clamp plate fastened by the bolt member extends through the clamp body to engage a pivotable arm of the actuator in the closed position of the first clamp.

20. The rack of claim 19, wherein the actuator tensions the clamp body relative to the bolt member to fix the clamp body against the first beam structure in the closed position of the first clamp.

* * * * *